United States Patent

Mason

[11] Patent Number: 6,045,196
[45] Date of Patent: Apr. 4, 2000

[54] BIMETAL VEHICLE WHEEL WITH BIMETAL TRANSITION INSERT

[75] Inventor: Douglas P. Mason, Livonia, Mich.

[73] Assignee: Hayes Lemmerz International, Inc., Northville, Mich.

[21] Appl. No.: 09/182,132

[22] Filed: Oct. 29, 1998

Related U.S. Application Data

[60] Provisional application No. 60/064,447, Oct. 31, 1997.

[51] Int. Cl.[7] ...................................................... B60B 23/00
[52] U.S. Cl. ........................ 301/63.1; 301/65; 29/894.322
[58] Field of Search ................................. 301/63.1, 64.2, 301/64.3, 64.4, 65, 95, 96, 97, 98; 29/894.3, 894.32, 894.322, 894.323; 228/208, 210, 226

[56] References Cited

U.S. PATENT DOCUMENTS

| | | |
|---|---|---|
| 3,506,311 | 4/1970 | Nobach . |
| 4,190,297 | 2/1980 | Schmidt ................................. 301/63.1 |
| 4,363,347 | 12/1982 | Baumgartner . |
| 4,363,521 | 12/1982 | Bonniwell et al. ..................... 301/63.1 |
| 5,257,455 | 11/1993 | Iwatsuki . |
| 5,421,642 | 6/1995 | Archibald ................................. 301/65 |
| 5,526,977 | 6/1996 | Wei ............................... 29/894.322 X |

FOREIGN PATENT DOCUMENTS

0 096 399   12/1983   European Pat. Off. .

*Primary Examiner*—Russell D. Stormer
*Attorney, Agent, or Firm*—MacMillan, Sobanski & Todd, LLC

[57] ABSTRACT

At least one bimetal tab is disposed in a groove between a wheel disc formed from a first metal and a wheel rim formed from a second metal which is different from the first metal. The bimetal tab is formed by roll bonding a layer of the first metal to a layer of the second metal. The first metal layer of the bimetal tab is adjacent to the wheel disc while the second metal layer of the tab is adjacent to the wheel disc. A spot weld which extends through the bimetal tab secures the wheel disc to the wheel rim.

18 Claims, 6 Drawing Sheets

BIMETAL VEHICLE WHEEL WITH BIMETAL TRANSITION INSERT

CROSS REFERENCE TO RELATED APPLICATIONS

This application claims the benefit of U.S. Provisional Application No. 60/064,447, filed on Oct. 31, 1997.

BACKGROUND OF THE INVENTION

This invention relates in general to vehicle wheels and in particular to two piece bimetal wheels having a wheel rim attached to a wheel disc with a bimetal transition insert.

It is known in the art to fabricate a vehicle wheel by attaching a wheel rim to a separately formed wheel disc. Typically, the wheel rim is rolled from steel strip stock and the wheel disc is stamped from steel sheet stock. The rim is welded to the disc to form the wheel. Such a wheel is shown in U.S. Pat. No. 5,257,455 to Iwatsuki. Alternately, the wheel rim can be rolled from steel and the wheel disc cast or forged from a light weight metal, such as aluminum, titanium or magnesium, or an alloy of a light weight metal. When the metals forming the wheel rim and wheel disc are different, it is difficult to provide a good weld between the rim and disc. To address this problem, a ferrous weld anchor is usually attached to the wheel disc. The wheel rim is welded to the weld anchor to assure that a good weld is formed between the rim and disc. Such a wheel is described in U.S. Pat. No. 3,506,311 to Nobach and is commonly referred to as a bimetal wheel. A bimetal wheel combines the economy, flexibility and strength of a steel rim with a pleasing aesthetic appearance of three dimensional contours formed in a cast or forged wheel disc.

To enhance the appearance of a two piece wheel, it is known to attach a full face wheel disc which includes the outboard tire retaining flange to a partial wheel rim to form a full face bimetal wheel. When a tire is mounted upon a full face wheel, the joint between the wheel disc and wheel rim is completely hidden and only the wheel disc is visible. A decorative finish is often applied to the face of the wheel disc to further enhance the appearance of the wheel. Examples of typical decorative finishes include metal plating, such as chromium plating, clear coatings and paint.

Figure 1:
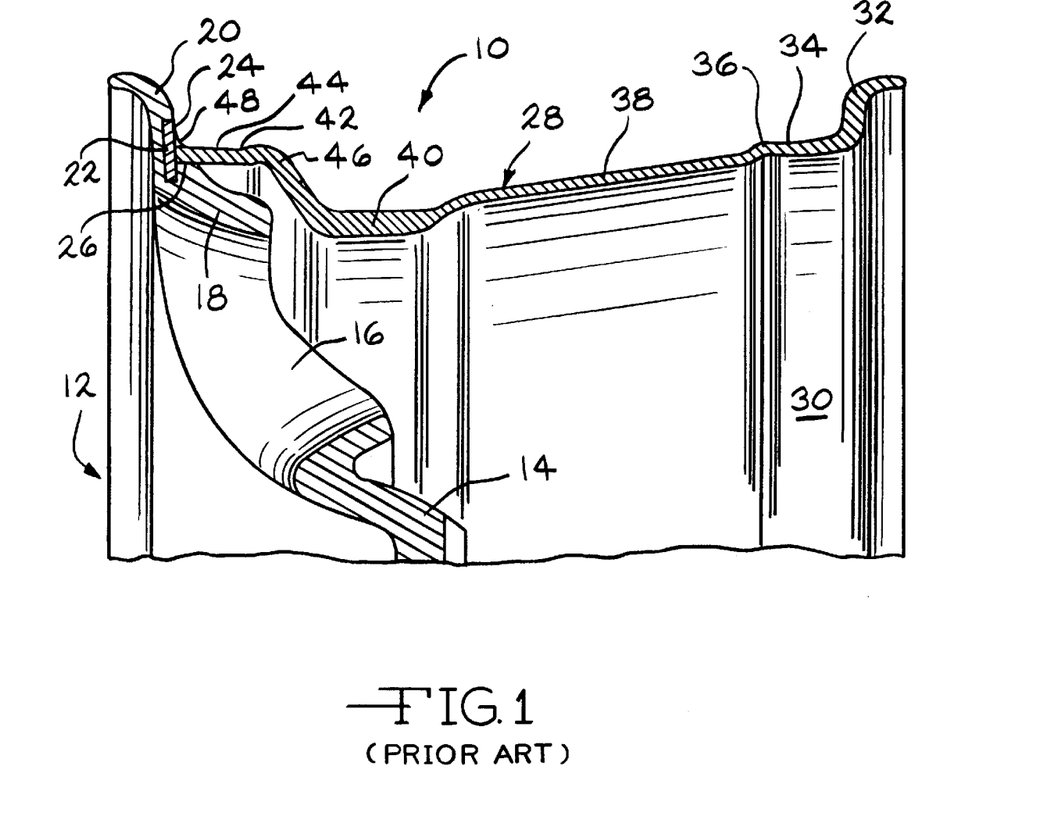
FIG. 1 is a fragmentary sectional view of a prior art two piece bimetal wheel.

Referring now to the drawings, there is shown in FIG. 1 a fragmentary sectional view of a typical prior art bimetal full face wheel 10. The wheel 10 is described in the Nobach patent listed above and includes a full face wheel disc 12 formed from a light weight metal or light weight metal alloy by a conventional process, such as gravity, low pressure or die casting. The wheel disc 12 includes a central wheel hub 14 which is supported by a plurality of wheel spokes 16 (one is shown) within an annular sidewall 18. An outboard tire bead retaining flange 20 extends in a radial outward direction from the sidewall 18.

A ring-shaped weld anchor 22 formed from a ferrous material, such as steel, is partially embedded in the wheel disc sidewall 18. A portion of the weld anchor 22 is exposed to form a welding surface 24. The sidewall 18 further includes a cylindrically-shaped collar 26 which extends axially from the inboard side of the flange 20. The collar 26 extends radially over a portion of the weld anchor 22 to secure the weld anchor 22 to the wheel disc 12.

A conventional partial wheel rim 28 is attached to the inboard side of the wheel disc 12. The wheel rim 28 is formed from steel strip stock with conventional rim roll forming machinery. The wheel rim 28 includes an inboard end 30 which terminates in a conventional inboard tire bead retaining flange 32. An inboard tire bead seat 34 and inboard safety bead 36 are also formed on the inboard end 30 of the wheel rim 28. A leg portion 38 extends in an outward axial direction from the inboard safety bead 36. A deepwell 40 is formed in the wheel rim 28 adjacent to the leg portion 38. The wheel rim 28 also includes a cylindrically-shaped outboard end 42 which is adjacent to the deepwell 40. The outboard wheel rim end 42 includes an outboard tire bead seat 44 and outboard safety bead 46. The outboard rim end 42 extends over the wheel disc collar 26 and into contact with the welding surface 24 of the weld anchor 22. The outboard rim end 42 and the wheel disc collar 26 are sized to form a clearance fit therebetween, allowing the wheel rim 28 to be rotated relative to the wheel disc 12.

An alternate structure for the weld anchor is disclosed in U.S. Pat. No. 5,421,642 to Archibald where the weld anchor includes an annular collar which is received by the outboard end of a partial wheel rim. The weld anchor collar positions the wheel rim on the wheel disc.

A continuous circumferential air-tight weld 48 is formed between the wheel rim 28 and the weld anchor 22. Typically, a conventional friction or inertial welding process is used to form the weld 48. During the welding process, the wheel disc 12 is held stationary while the wheel rim 28 is rotated with the outboard rim end 42 pressed against the weld anchor 22. The heat generated by friction partially melts the outboard rim end 42 and the adjacent portion of the weld anchor 22 to form the weld 48.

While the wheel disc is typically welded to the wheel rim, it is also known to heat shrink the wheel rim onto the wheel disc, as shown in U.S. Pat. No. 4,363,347 to Baumgartner and European Patent Application No. 0 096 399 to Stahl-schmidt & Malwurm GmbH & Co. KG. The U.S. Patent discloses wheel structures having either cylindrical or conical shrinkage surfaces. The U.S. Patent also discloses optional cutting or rolling of threads on the cylindrical shrinkage surfaces to allow the disc to be threadedly attached to the wheel rim.

SUMMARY OF THE INVENTION

This invention relates to a two piece bimetal wheel having a wheel rim attached to a wheel disc with a bimetal transition insert.

A number of methods for joining dissimilar metals are available. Such methods include soldering, brazing, welding, bolting, riveting and other mechanical fasteners. Optimum design of the assembly requires that the joining technique provide a maximum strength to cost ratio. For attaching steel wheel discs to steel wheel rims, welding has provided the maximum ratio. However, attempts to weld an aluminum wheel disc to a steel wheel successful due to the wide difference between the melting temperature of steel and the melting temperature of aluminum. Since both materials must be fused to form a weld, attempts to spot weld steel to aluminum result in splashing of the aluminum due to excessive heating. Once the aluminum and steel have been fused, they form brittle intermetallic compounds upon cooling which may result in joints having little or no ductility and poor structural stability.

Accordingly, the wheel rim of a two piece bimetal wheel is usually attached to the wheel disc by use of a weld anchor, to assure that a good weld is formed between the rim and disc formed from different metals. Typically, a friction or inertial welding process is used to form the weld. The attachment of the wheel rim to the wheel disc by use of the weld anchor and a friction welding process is relatively time consuming. This increases the cost of fabricating the two piece bimetal wheel. Thus, it would be desirable to provide a quicker method of fabricating two piece bimetal wheels. It would also be desirable to fabricate two piece bimetal wheels without the need to heat shrink the wheel rim onto the wheel disc. The heating shrinking operation increases the time and cost of assembly.

The present invention contemplates a two piece vehicle wheel having a wheel disc formed from a first metal. The wheel disc includes a cylindrical inboard shoulder extending axially therefrom. The wheel also includes a wheel rim formed from a second metal which is different from the first metal. The wheel rim has a cylindrical outboard end which cooperates with the wheel disc shoulder to form a wheel disc assembly. A bimetal transition insert is disposed between the wheel disc shoulder and the outboard wheel rim end. The bimetal transition insert includes a layer of the first metal disposed adjacent to the wheel disc shoulder and a layer of the second metal disposed adjacent to the outboard wheel rim end. A weld is formed between the wheel disc shoulder and the outboard wheel rim end which extends though the bimetal transition insert to secure the wheel disc to the wheel rim.

The invention further contemplates that at least one groove is formed in one of the wheel disc shoulder and the outboard wheel rim end. The groove receives the bimetal transition insert. Additionally, in the preferred embodiment, the first and second layers of the bimetal transition insert are roll bonded together and the weld securing the wheel disc to the wheel rim is a spot weld. The wheel further includes a resilient material disposed between the wheel rim end and the wheel disc shoulder to form an air tight seal therebetween. Additionally, the resilient material can include an adhesive to further secure the wheel disc to the wheel rim. The invention may be practiced with either the wheel rim end received within the wheel disc shoulder or the wheel disc shoulder extending axially into the wheel rim end.

In the preferred embodiment, a plurality of axially extending grooves are formed in one of the wheel disc shoulder and the outboard wheel rim end, and a plurality of bimetal transition inserts are disposed in the grooves. A plurality of welds are formed between the wheel disc shoulder and the outboard wheel rim end with each of the welds extending through one of the bimetal transition inserts to secure the wheel disc to the wheel rim. Alternately, an annular groove can be formed which extends about the circumference of one of the wheel disc shoulder and the outboard wheel rim end. With the alternate structure, the bimetal transition insert is a hoop which is disposed in the annular groove.

The invention also contemplates a process for fabricating a two piece vehicle wheel which includes providing a wheel disc formed from a first metal. The wheel disc includes a cylindrical inboard shoulder extending axially therefrom. A wheel rim formed from a second metal which is different from the first metal and has a cylindrical outboard end also is provided. A groove is formed in one of the wheel disc shoulder and the outboard wheel rim end. A bimetal transition insert having a layer of the first metal bonded to a layer of the second metal is disposed in the groove with the layer of first metal facing the wheel disc shoulder. The wheel rim and the wheel disc are then assembled with the wheel disc shoulder cooperating with the outboard wheel rim end so that the bimetal transition insert is disposed therebetween. Finally, a weld is formed between the wheel disc shoulder and the outboard wheel rim end with the weld extending through the bimetal transition insert to secure the wheel disc to the wheel rim.

The process can further include applying a resilient material to a surface of one of the wheel disc shoulder and the outboard wheel rim end before assembling the wheel rim and wheel disc. The sealant is disposed continuously along the entire 360 degree circumference of either the wheel disc shoulder or the outboard wheel rim to form an air-tight seal therebetween when the wheel rim and the wheel disc are assembled.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
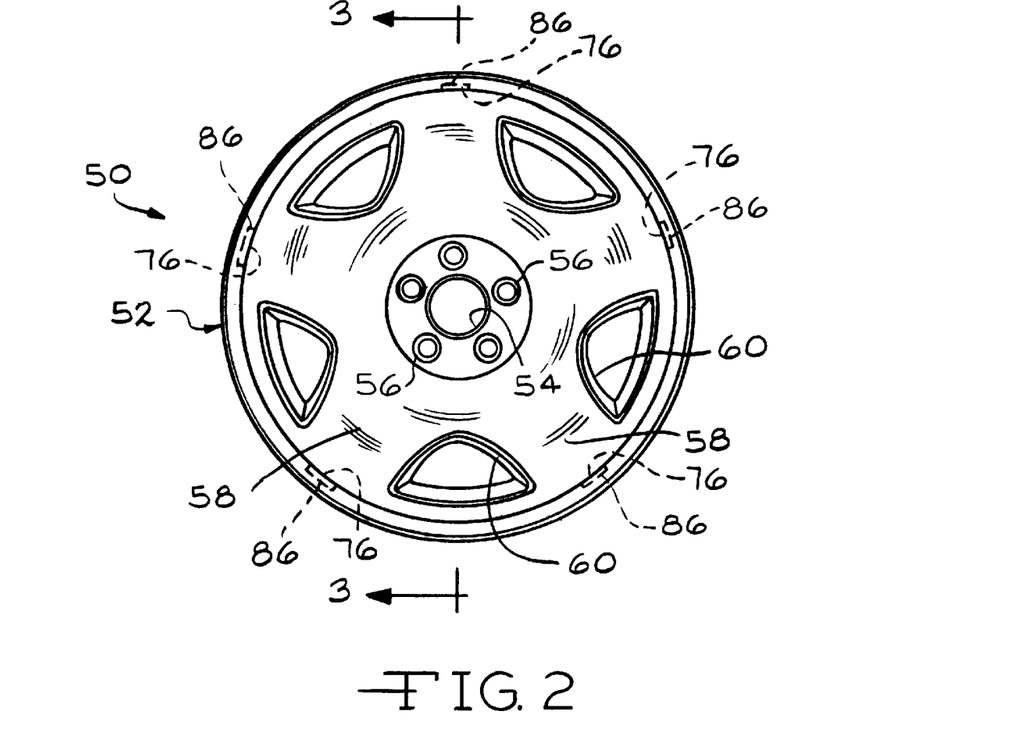
FIG. 2 is a front view of a two piece bimetal wheel in accordance with the invention.
Figure 3:
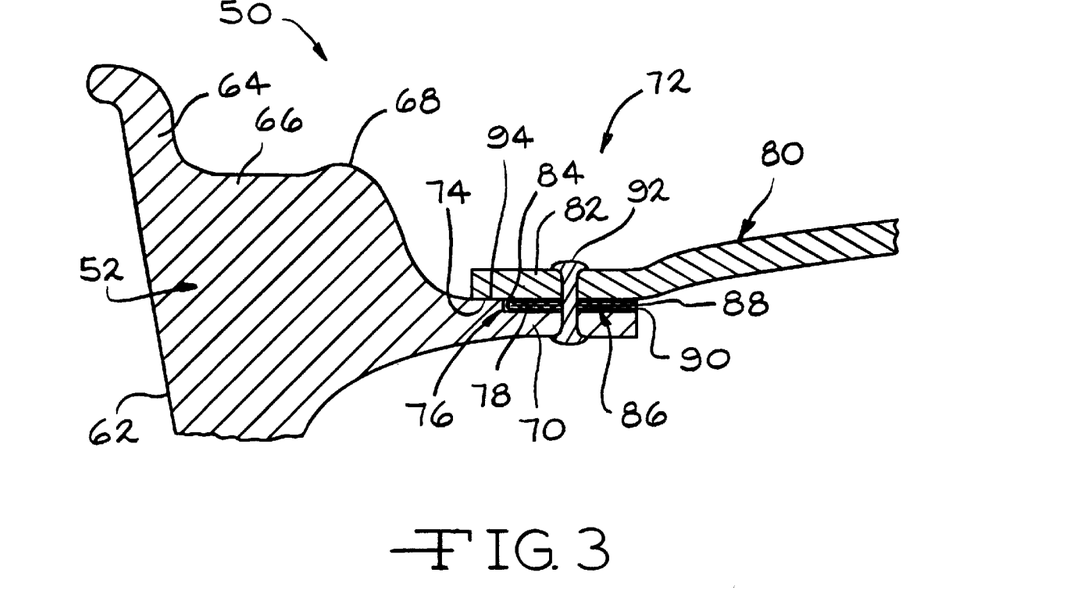
FIG. 3 is a fragmentary sectional view of the wheel shown in FIG. 2, taken along line 3—3 of FIG. 2.

The present invention contemplates a two piece bimetal wheel having a wheel rim attached to a wheel disc with a bimetal transition insert. Referring now to FIGS. 2 and 3, there is illustrated a two piece bimetal wheel 50 in accordance with the invention. The wheel 50 includes a full face wheel disc 52 formed from a light weight metal, such as aluminum, titanium or magnesium, or an alloy of a light weight metal, by a conventional process, such as gravity or low pressure casting, or forging. In the preferred embodiment, the wheel disc 52 includes a decorative surface finish (not shown), such as a layer of chrome plating, a layer of paint or a clear coating.

The wheel disc 52 includes a centrally disposed pilot opening 54 and a plurality of wheel lug holes 56 uniformly disposed thereabout. The wheel lug holes 56 receive mounting studs (not shown) which extend from the vehicle wheel hub (not shown). The wheel disc 52 includes a plurality of spokes 58 or other supporting structures which define a plurality of through openings 60. The through openings 60 provide ventilation for vehicle disc brake assemblies or other components positioned within the wheel 50.

The wheel disc 52 further includes an annular sidewall 62. An outboard tire bead retaining flange 64 extends in a radial outward direction from the sidewall 62. The radially outer surface of the sidewall 62 defines an outboard tire bead seat 66 and an outboard safety bead 68. The wheel disc 52 also includes a cylindrical inboard shoulder 70 in the area of a deepwell 72. The shoulder 70 includes a radially outer surface 74.

A plurality of grooves 76 are formed in the outer surface 74 of the shoulder 70. The grooves 76 are formed in the shoulder 70 by machining or another conventional method. Preferably, the grooves 76 are relatively evenly spaced around the circumference of the shoulder 70. In the illustrated embodiment, five grooves 76 are formed in the outer surface 74 of the shoulder 70, generally adjacent to the spokes 58 of the wheel disc 52. The grooves 76 are rectangular in shape, and extend axially along the shoulder 70. The grooves 76 are relatively shallow, preferably having a depth of from about 0.040 inch (0.1016 cm.) to about 0.050 inch (0.127 cm.) and a width from about ⅜ inch (0.9525 cm.) to about ⅝ inch (1.5875 cm.), depending on the expected loading of the wheel 50. The radially inner surface 78 of the groove 76 is concentric with the wheel rim 80. The purpose of the grooves 76 will be described below.

The wheel 50 includes a partial wheel rim 80 which, in the preferred embodiment, is formed from steel. The wheel rim 80 is preferably formed from steel strip stock with conventional wheel rim roll forming machinery; however, it will be appreciated that the wheel rim 80 also can be formed with a casting or forging process. The wheel rim 80 has a cylindrical outboard end 82. The wheel rim end 82 and the wheel disc shoulder 70 cooperate to form the deepwell 72 of the wheel 50. The wheel rim end 82 includes a radially inner surface 84. The wheel rim end 82 extends axially over the wheel disc shoulder 70 and covers the grooves 76. The inner surface 84 of the wheel rim 80 is adjacent to the outer surface 74 of the wheel disc shoulder 70.

A plurality of bimetal transition inserts in the form of bimetal tabs 86 are disposed in the grooves 76 in the outer surface 74 of the shoulder 70. The bimetal tabs 86 are thin, rectangular pieces which preferably have a thickness from about 0.040 inch (0.1016 cm.) to about 0.050 inch (0.127 cm.) and a width from about ⅜ inch (0.9525 cm.) to about ⅝ inch (1.5875 cm.) which correspond to the dimensions of the grooves 76. Each bimetal tab 86 includes an outer layer 88 which is adjacent to the inner surface 84 of the wheel rim 80 and formed from the same metal as the rim 80. Each tab 86 also includes an inner layer 90 which is adjacent to the shoulder 70 of the wheel disc 52 and formed from the same metal as the disc 52.

In the preferred embodiment, the outer layer 88 is formed from an alloy of steel and the inner layer 90 is formed from an alloy of aluminum. Accordingly, in the preferred embodiment, the bimetal tabs 86 are cut from a rolled aluminum/steel sheet (not shown). The steel and aluminum layers of the sheet are attached to one another by diffusion bonding when the sheet is rolled. The bimetal tabs 86 are disposed in the grooves 76 with the aluminum layer 90 adjacent to the shoulder 70 of the aluminum wheel disc 52, and the steel layer 88 adjacent to the wheel rim end 82 of the steel wheel rim 80. The wheel disc 52 is attached to the wheel rim 80 with spot welds 92 which extend through the bimetal tabs 86. The expected loading of the wheel 50 will determine the number of spot welds 92 used through each of the bimetal tabs 86, and thus the length of the tabs 86 (a single or multiple spot welds 92 may be used). The aluminum layer 90 of the bimetal tab 86 is welded to the aluminum wheel disc 52, and the steel layer 88 of the bimetal tab 86 is welded to the steel wheel rim 80.

The bimetal tabs 86 convert a steel to aluminum joint into a plurality of aluminum to aluminum and steel to steel joints. The actual dissimilar metal connection occurring at the bond interface between the steel layer 88 and aluminum layer 90 of the bimetal tab 86 is made by a low temperature, solid phase roll bonding operation during the fabrication of the tabs 86. The roll bonding process includes three operations. First, strips of the metals to be bonded undergo surface preparation. The surface preparation can include a chemical and mechanical process during which the surfaces are scrubbed with an alkaline detergent to remove organic materials and oils. The surfaces are then subjected to an acid pickling process to reduce metal oxide formation upon the surface. Next, the surfaces are mechanically brushed, rinsed and dried with hot air. Alternately, the surfaces can be subjected to dry grinding. Either surface preparation process is applied on line immediately before the metals are bonded.

The strips are roll bonded together by a high roll bonding mill. The strips are fed into a pair or rollers which press the strips together under high pressure. The rolling produces massive mechanical deformation in the metal while generating localized high pressure and heat. Typically, the metal can undergo a 65 percent thickness reduction while the surfaces are extended over three times their original area. The metal surfaces are brought within inter-atomic distances.

After rolling, the bimetal strip is heat treated. Typically, the strip sintered by heating under pressure to remove impurities and then annealed to release residual stresses. The bimetal strip is then cut into the individual tabs 86.

When the wheel disc 52 and wheel rim 80 are spot welded through the bimetal tabs 86, the aluminum layer 90 of the bimetal tab 86 fuses with the aluminum of the wheel disc 52, and the steel layer 88 of the bimetal tab 86 fuses with the steel of the wheel rim 80. With appropriate welding parameters and thicknesses of the bimetal tabs 86, the wheel disc 52 and wheel rim 80 can be spot welded in one pass without the formation of brittle steel-aluminum intermetallic compounds. Thus a strong, ductile, reliable connection is formed between the aluminum wheel disc 52 and the steel wheel rim 80.

Additionally, the use of the tabs 86 reduces galvanic action between the aluminum and steel at the weld joint. With a direct aluminum to steel joint, crevices are formed between the aluminum and steel surfaces which can trap water. The trapped water causes a galvanic action to occur between the dissimilar surfaces which produces corrosion and may weaken the weld. However, since galvanic corrosion can only occur at the bond interface, and with the bimetal tabs 86, the metals are bonded at the atomic level, there are no crevices at the interface. Accordingly, the invention eliminates galvanically induced crevice corrosion.

A resilient material 94 is disposed between the wheel rim end 82 and the wheel disc shoulder 70 to assure an air-tight seal between the rim 80 and disc 52. The resilient material 94 is disposed along the entire 360 degree circumference between the wheel rim end 82 and the wheel disc shoulder 70, including the locations of the bimetal tabs 86. Preferably, the resilient material 94 is resistant to heat so that the spot welds 92 can be formed through the resilient material 94. It is contemplated that the resilient material can include an adhesive which would further secure the wheel disc 52 to the wheel rim 80. Alternately, only an adhesive could be applied which would, upon curing, form the air-tight seal.

Figure 4:
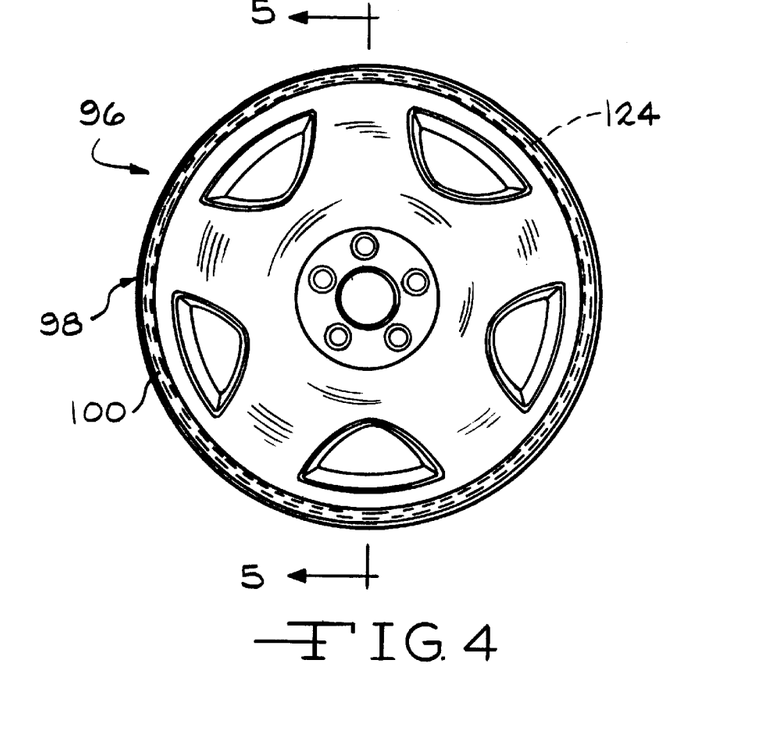
FIG. 4 is a front view of an alternate embodiment of the two piece bimetal wheel shown in FIG. 2.
Figure 5:
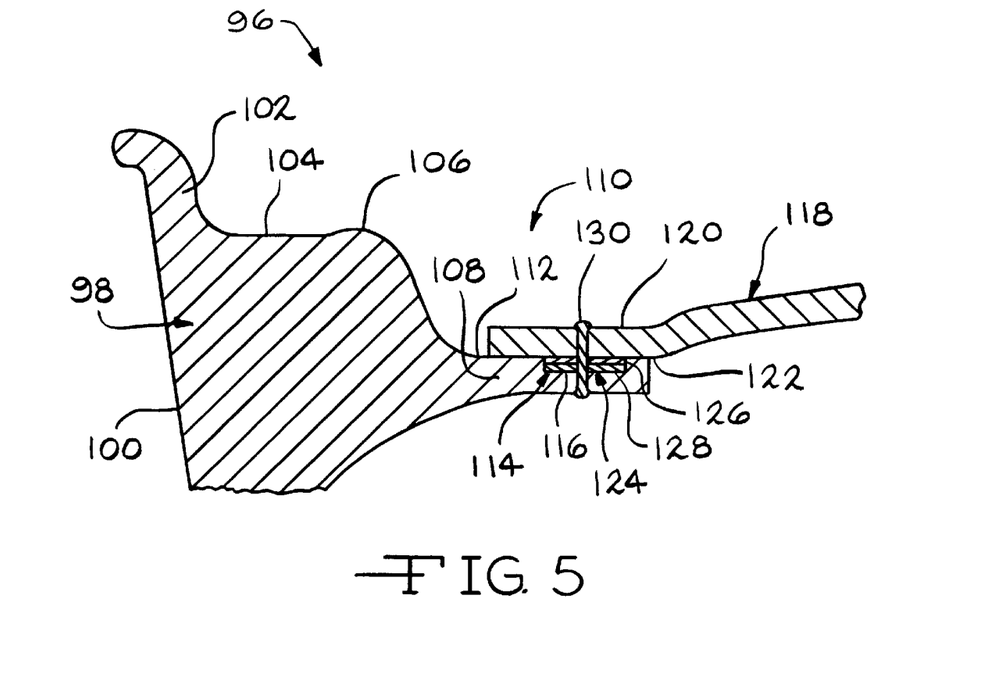
FIG. 5 is a fragmentary sectional view of the wheel shown in FIG. 4, taken along line 5—5 of FIG. 4.

Referring now to FIGS. 4 and 5, the invention further contemplates an alternate embodiment of a two piece bimetal wheel 96. The wheel 96 includes a full face wheel disc 98 formed from a light weight metal such as aluminum. The wheel disc 98 includes an annular sidewall 100. An outboard tire bead retaining flange 102 extends in a radial outward direction from the sidewall 100. The radially outer surface of the sidewall 100 defines an outboard tire bead seat 104 and an outboard safety bead 106. The wheel disc 98 also includes a cylindrical inboard shoulder 108 in the area of a deepwell 110. The shoulder 108 includes a radially outer surface 112.

An annular groove 114 is formed in the outer surface 112 of the shoulder 108. The annular groove 114 extends continuously around the entire 360 degree circumference of the shoulder 108. The annular groove 114 is relatively shallow, preferably having a depth of from about 0.040 inch (0.1016 cm.) to about 0.050 inch (0.127 cm.) and a width from about ⅜ inch (0.9525 cm.) to about ⅝ inch (1.5875 cm.) depending on the expected loading of the wheel 96. The radially inner surface 116 of the annular groove 114 is concentric with the outer surface 112 of the shoulder 108.

The wheel 96 also includes a partial wheel rim 118 which, in the preferred embodiment, is formed from steel. The wheel rim 118 has a cylindrical outboard end 120. The wheel rim end 120 and the wheel disc shoulder 108 cooperate to form the deepwell 110 of the wheel 96. The wheel rim end 120 includes a radially inner surface 122. The wheel rim end 120 extends axially over the wheel disc shoulder 108 and covers the annular groove 114. The inner surface 122 of the wheel rim 118 is adjacent to the outer surface 112 of the wheel disc shoulder 108.

A bimetal transition insert in the form of a bimetal hoop 124 is disposed in the annular groove 114 in the outer surface 112 of the shoulder 108. The bimetal hoop 124 is a thin, annular piece which preferably has a thickness from about 0.040 inch (0.1016 cm.) to about 0.050 inch (0.127 cm.) and a width from about ⅜ inch (0.9525 cm.) to about ⅝ inch (1.5875 cm.) which correspond to the dimensions of the annular groove 114. The bimetal hoop 124 includes an outer layer 126 which is adjacent to the inner surface 122 of the wheel rim 118 and formed from the same metal as the rim 118. The bimetal hoop 124 also includes an inner layer 128 which is adjacent to the shoulder 108 of the wheel disc 98 and formed from the same metal as the disc 98. In the preferred embodiment, the outer layer 126 is formed from an alloy of steel and the inner layer 128 is formed from an alloy of aluminum.

In the preferred embodiment, the bimetal hoop 124 is cut from a rolled aluminum/steel sheet (not shown), in which the steel and aluminum layers of the sheet are attached to one another by diffusion bonding when the sheet is rolled. The bimetal hoop 124 is disposed in the annular groove 114 with the aluminum layer 128 adjacent to the shoulder 108 of the aluminum wheel disc 98, and the steel layer 126 adjacent to the wheel rim end 120 of the steel wheel rim 118. The bimetal hoop 124 can be disposed by heat shrinking the hoop 124 into the groove 114. Alternately, the hoop 124 can include an axial slit which allows a snap fit into the groove 114.

The wheel disc 98 is attached to the wheel rim 118 with a seam weld 130 which extends through the bimetal hoop 124 along the entire 360 degree circumference of the wheel rim end 120 and the wheel disc shoulder 108. The expected loading of the wheel 96 will determine the width of the seam weld 130. The aluminum layer 128 of the bimetal hoop 124 is welded to the aluminum wheel disc 98, and the steel layer 126 of the bimetal hoop 124 is welded to the steel wheel rim 118. Thus, the bimetal hoop 124 overcomes the difficulty in welding the two different metals together. The 360 degree seam weld 130 assures an air-tight seal between the wheel rim 118 and wheel disc 98 so that no sealant is required. Alternately, the wheel disc 98 is attached to the wheel rim 118 with a plurality of spot welds (not shown), and a resilient material (not shown) is disposed between the wheel rim end 120 and the wheel disc shoulder 108 to assure an air-tight seal between the rim 118 and disc 98. Additionally, an adhesive can be included in the resilient material.

Figure 6:
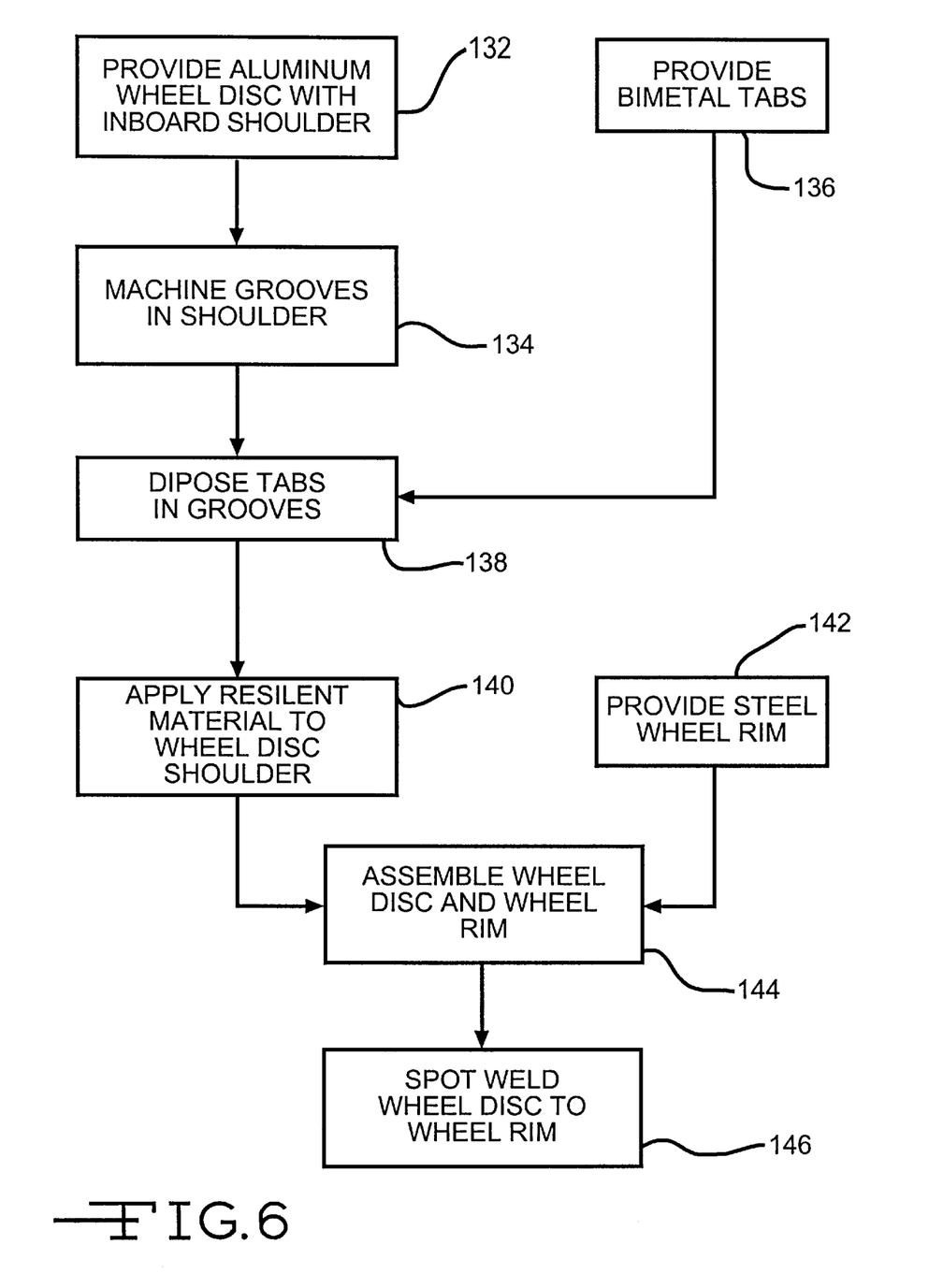
FIG. 6 is a flow chart of a process for fabricating the wheel shown in FIG. 2.

The invention also contemplates a process for fabricating the wheel shown in FIGS. 2 and 3, which is illustrated by a flow chart shown in FIG. 6. In functional block 132, an aluminum wheel disc having a cylindrical inboard shoulder is provided. In functional block 134, a plurality of grooves are machined in the radially outer surface of the shoulder. While machining is shown in functional block 134, it will be appreciated that other conventional methods can used to form the grooves. In functional block 136, a plurality of bimetal tabs are provided, each of the tabs including an aluminum layer and a steel layer. In functional block 138, the bimetal tabs are disposed in the grooves with the aluminum layer of the bimetal tabs adjacent to the aluminum wheel disc shoulder. In functional block 140, a heat resistant resilient material is applied along the entire 360 degree circumference of the wheel disc shoulder. Concurrently, in functional block 142, a steel wheel rim is provided including a cylindrical outboard end. In functional block 144, the wheel rim and the wheel disc are assembled with the wheel rim end extending axially over the wheel disc shoulder. The steel layer of the bimetal tabs is adjacent to the steel wheel rim. In functional block 146, the wheel rim end is spot welded to the wheel disc shoulder at the locations of the bimetal tabs. The aluminum layer of the bimetal tab is welded to the aluminum wheel disc, and the steel layer of the bimetal tab is welded to the steel wheel rim. The resilient material provides an airtight seal between the wheel disc and wheel rim.

Figure 7:
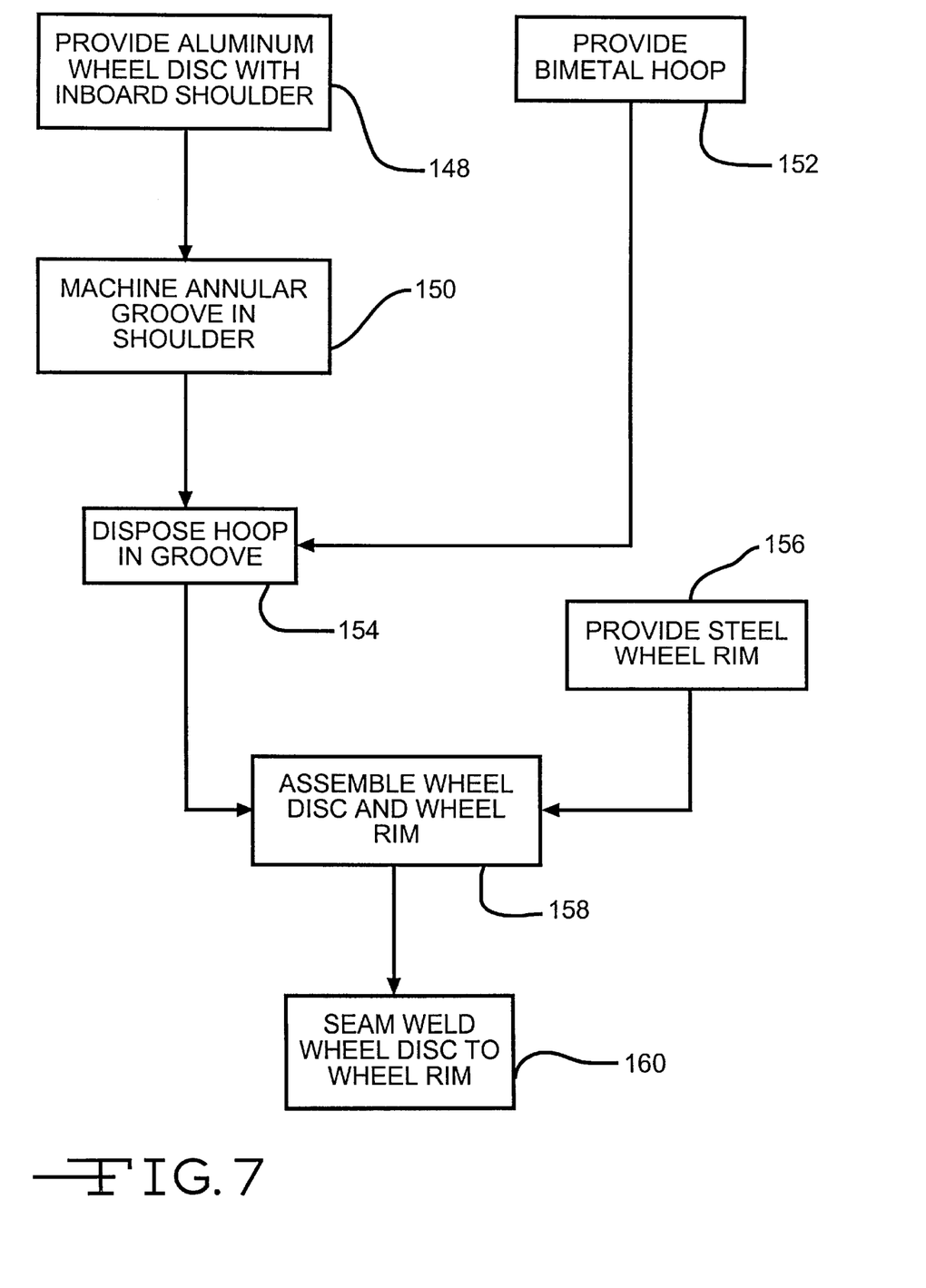
FIG. 7 is a flow chart of a process for fabricating the wheel shown in FIG. 4.

The invention also contemplates a process for fabricating the wheel shown in FIGS. 4 and 5, which is illustrated by a flow chart shown in FIG. 7. In functional block 148, an aluminum wheel disc having a cylindrical inboard shoulder is provided. In functional block 150, an annular groove is machined in the radially outer surface of the shoulder. In functional block 152, a bimetal hoop is provided including an aluminum layer and a steel layer. In functional block 154, the bimetal hoop is disposed in the annular groove with the aluminum layer of the bimetal hoop adjacent to the aluminum wheel disc shoulder. Concurrently, in functional block 156, a steel wheel rim is provided including a cylindrical outboard end. In functional block 158, the wheel rim and the wheel disc are assembled with the wheel rim end extending axially over the wheel disc shoulder. The steel layer of the bimetal hoop is adjacent to the steel wheel rim. In functional block 160, the wheel rim end is seam welded to the wheel disc shoulder along the entire 360 degree circumference between the wheel rim end and the wheel disc shoulder. The aluminum layer of the bimetal hoop is welded to the aluminum wheel disc, and the steel layer of the bimetal hoop is welded to the steel wheel rim. Alternately, a plurality of spot welds can be formed in functional block 160 to secure the wheel disc to the wheel rim. The process can optionally include applying a layer of a resilient material either the wheel disc shoulder or the outboard end of the wheel rim before assembly of the wheel disc and wheel rim to form an air-tight seal therebetween.

While the preferred embodiment of the bimetal transition insert of the invention has been illustrated in terms of a bimetal tab and a bimetal hoop, it will be appreciated that the invention also can be practiced with other shapes and sizes of bimetal transition inserts. Additionally, while the bimetal wheel and bimetal transition insert have been illustrated in terms of steel and aluminum, it also is understood that other types of dissimilar metals can also be utilized in the invention. For example, instead of using steel, the wheel rim could be formed from another light weight metal alloy. Although the illustrated groove is formed in the wheel disc shoulder, the groove could instead be formed in the wheel rim end or a portion of the groove could be formed in each of the wheel disc shoulder and the wheel rim end.

Figure 8:
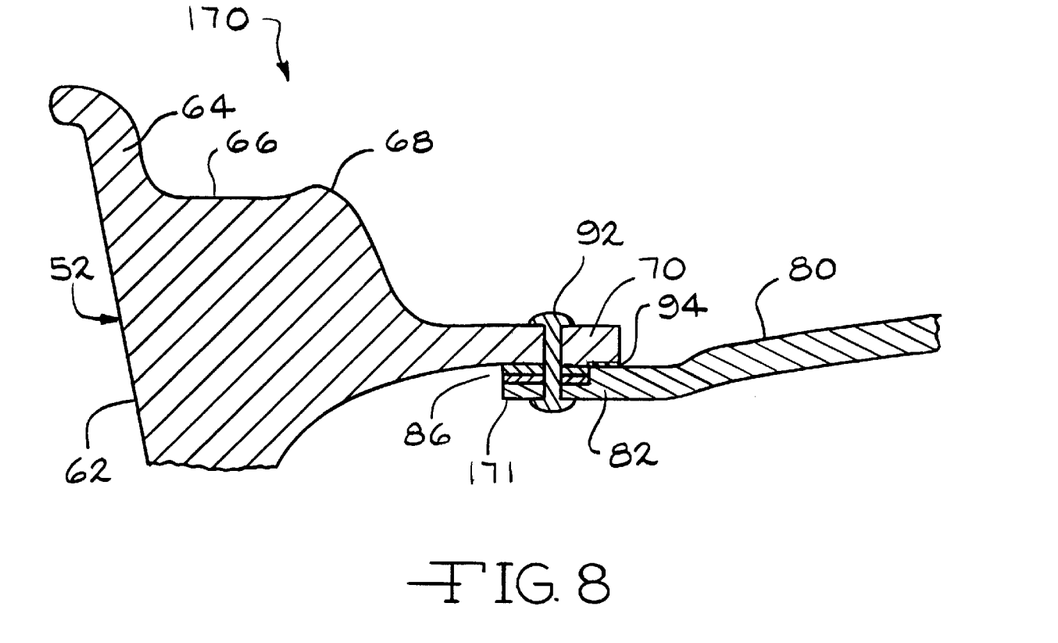
FIG. 8 is an alternate embodiment of the wheel shown in FIG. 3.
Figure 9:
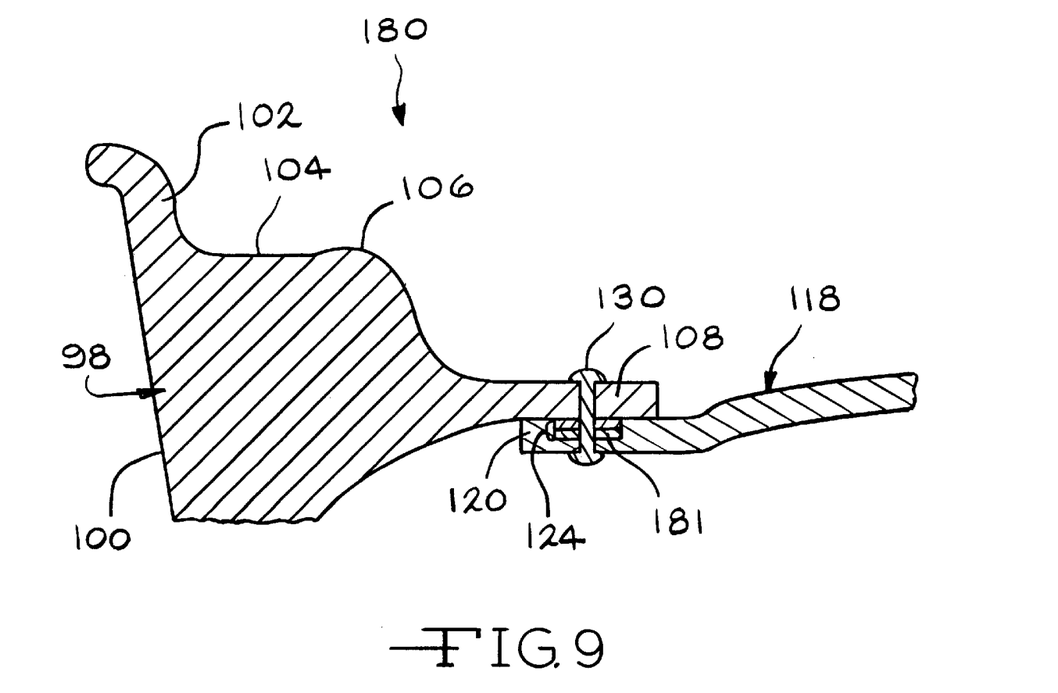
FIG. 9 is an alternate embodiment of the wheel shown in FIG. 5.

While the illustrated two piece wheel includes the wheel rim end having a larger diameter than the wheel disc shoulder, the invention is also applicable to two piece wheels in which the wheel disc shoulder has a larger diameter than the wheel rim end, as illustrated by the wheel 170 shown in FIG. 8. Components of the wheel 180 which are similar to components shown in FIG. 3 have the same numerical designators. As shown in FIG. 8, the wheel rim end 82 extends axially into the wheel disc shoulder 70 with the bimetal transition inserts disposed between the radially inner surface of the wheel disc shoulder and the radially outer surface of the wheel rim end. Additionally, grooves 171, which receive the bimetal inserts 86, are formed in the outboard wheel rim end 82. Alternately, a bimetal hoop 124 can be utilized, as illustrated by the wheel 180 shown in FIG. 9. Components shown in FIG. 9 which are similar to components shown in FIG. 5 have the same numerical designators. In FIG. 9, an annular groove 181, which receives the bimetal hoop 124 is formed in the outboard wheel rim end 120.

While the wheel disc shoulder and wheel rim end have been illustrated in particular positions on the wheel disc and wheel rim, they also could be positioned in other locations compatible with assembling the wheel. For example, the wheel disc shoulder could be formed to include a portion of the outboard tire bead seat while the outboard end of the wheel rim could include the outboard tire safety hump and the remaining portion of the outboard tire bead seat (not shown). The wheel rim would be joined to the wheel disc along the outboard tire bead seat.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope. For example, while the preferred embodiment of the invention has been illustrated and described for attaching a full face wheel disc to a partial wheel rim, it will be appreciated that the invention also may be practiced to attach a wheel disc or spider within a full wheel rim (not shown).

What is claimed is:

1. A two piece vehicle wheel comprising:
   a wheel disc formed from a first metal and including a cylindrical inboard shoulder extending axially therefrom;
   a wheel rim formed from a second metal which is different from said first metal, said wheel rim including a cylindrical outboard end, said outboard wheel rim end cooperating with said wheel disc shoulder to form a wheel disc assembly;
   a bimetal transition insert disposed between said wheel disc shoulder and said outboard wheel rim end, said bimetal transition insert including a layer of said first metal disposed adjacent to said wheel disc shoulder and a layer of said second metal disposed adjacent to said outboard wheel rim end; and
   a weld formed between said wheel disc shoulder and said outboard wheel rim end, said weld extending though said bimetal transition insert to secure said wheel disc to said wheel rim.

2. The wheel according to claim 1 further including at least one groove formed in one of said wheel disc shoulder and said outboard wheel rim end, said groove receiving said bimetal transition insert.

3. The wheel according to claim 2 wherein said first and second layers of said bimetal transition insert are roll bonded together.

4. The wheel according to claim 3 wherein said weld is a spot weld.

5. The wheel according to claim 4 further including a resilient material disposed between said wheel rim end and said wheel disc shoulder, said resilient material forming an air tight seal between said wheel rim end and said wheel disc shoulder.

6. The wheel according to claim 5 wherein said resilient material includes an adhesive.

7. The wheel according to claim 4 wherein said wheel rim end is received within said wheel disc shoulder.

8. The wheel according to claim 4 wherein said wheel disc shoulder extends axially into said wheel rim end.

9. The wheel according to claim 3 wherein a plurality of axially extending grooves are formed in one of said wheel disc shoulder and said outboard wheel rim end, and further wherein a plurality of bimetal transition inserts are disposed in said grooves and a plurality of welds are formed between said wheel disc shoulder and said outboard wheel rim end, each of said welds extending through one of said bimetal transition inserts to secure said wheel disc to said wheel rim.

10. The wheel according to claim 9 further including a resilient material disposed between said outboard wheel rim end and said wheel disc shoulder, said resilient material forming an air-tight seal therebetween.

11. The wheel according to claim 3 wherein said groove is annular and extends about the circumference of one of said wheel disc shoulder and said outboard wheel rim end, and further wherein said bimetal transition insert is a hoop which is disposed in said groove.

12. The wheel according to claim 11 wherein said weld is a continuous 360 degree circumferential weld, said weld forming an air-tight seal between said wheel disc and said wheel rim.

13. The wheel according to claim 11 wherein a plurality of spot welds are formed between said wheel disc shoulder and said outboard end of said wheel rim, said welds extending through said bimetal hoop.

14. The wheel according to claim 13 further including a resilient material disposed between said outboard wheel rim end and said wheel disc shoulder, said resilient material forming an air-tight seal therebetween.

15. A process for fabricating a two piece vehicle wheel comprising the steps of:
   (a) providing a wheel disc formed from a first metal and including a cylindrical inboard shoulder extending axially therefrom and a wheel rim formed from a second metal which is different from the first metal, the wheel rim including a cylindrical outboard end;
   (b) forming a groove in one of the wheel disc shoulder and the outboard wheel rim end;
   (c) disposing a bimetal transition insert having a layer of the first metal bonded to a layer of the second metal in the groove with the layer of first metal facing the wheel disc shoulder;
   (d) assembling the wheel rim and the wheel disc with the wheel disc shoulder cooperating with the outboard wheel rim end so that the bimetal transition insert is disposed therebetween; and (e) forming a weld between the wheel disc shoulder and outboard wheel rim end, the weld extending through the bimetal transition insert to secure the wheel disc to the wheel rim.

16. The process of claim 15 including, subsequent to step (c), applying a resilient material to a surface of one of the wheel disc shoulder and the outboard wheel rim end, the sealant being disposed continuously along the entire 360 degree circumference of the one of the wheel disc shoulder and the outboard wheel rim, the resilient material forming an air-tight seal therebetween when the wheel rim and the wheel disc are assembled in step (d).

17. The process of claim 15 wherein the outboard wheel rim end is received within the wheel disc shoulder when the wheel rim and disc are assembled in step (d).

18. The process of claim 15 wherein the outboard wheel rim end extends over the wheel disc shoulder when the wheel rim and disc are assembled in step (d).

* * * * *